April 6, 1943.  G. A. DENTON  2,315,777

AUTOMATIC BEVERAGE BREWER

Filed April 12, 1940  4 Sheets-Sheet 1

INVENTOR
George A. Denton
BY
Scott L. Nourse
ATTORNEY

INVENTOR
George A. Denton
BY Scott L. Nourse
ATTORNEY

April 6, 1943.  G. A. DENTON  2,315,777
AUTOMATIC BEVERAGE BREWER
Filed April 12, 1940  4 Sheets-Sheet 3

INVENTOR
George A. Denton
BY
Scott L. Norvell
ATTORNEY

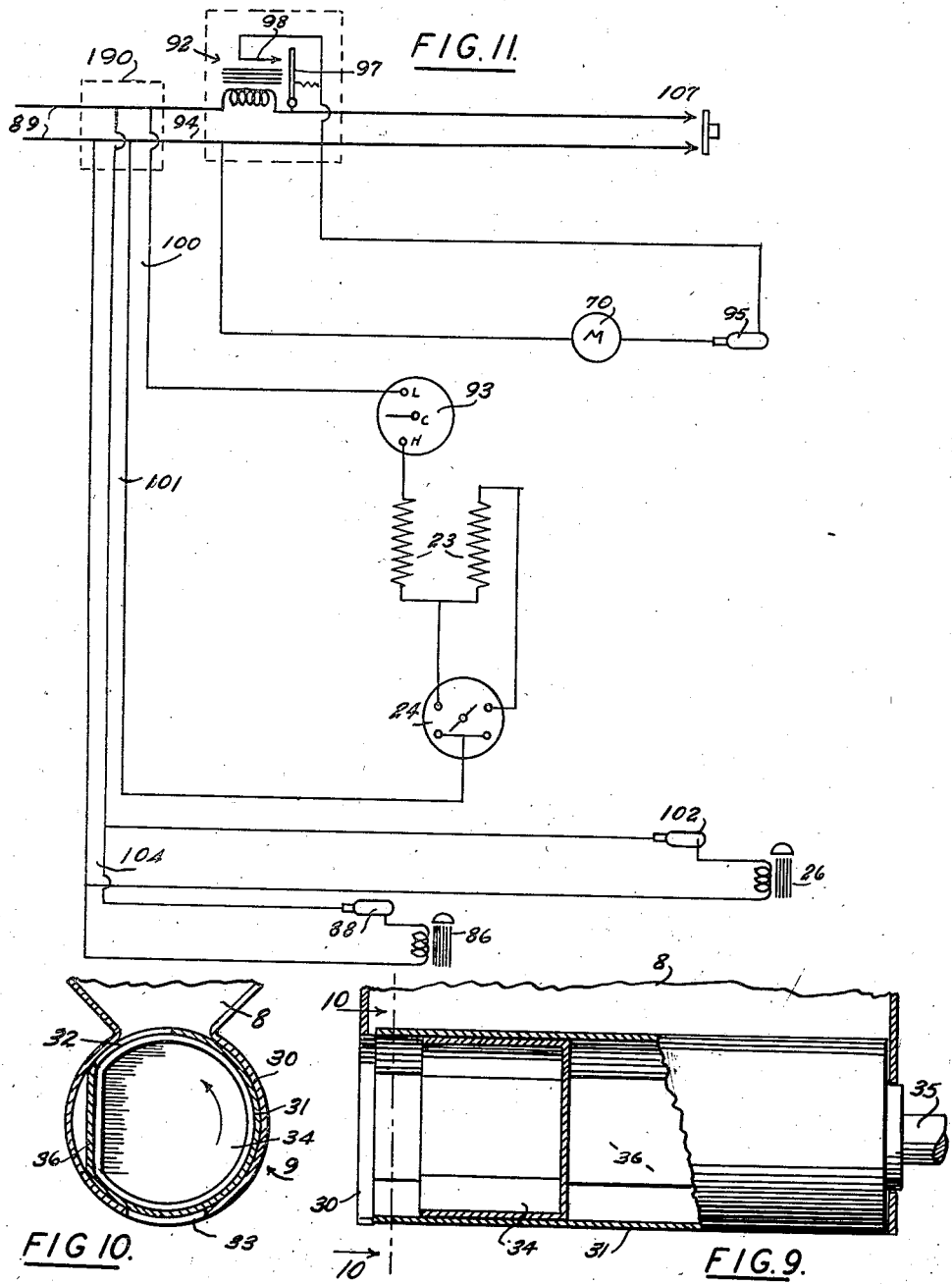

Patented Apr. 6, 1943

2,315,777

UNITED STATES PATENT OFFICE 2,315,777

AUTOMATIC BEVERAGE BREWER

George A. Denton, Flagstaff, Ariz.

Application April 12, 1940, Serial No. 329,334

4 Claims. (Cl. 53—3)

This invention relates to devices for automatically brewing beverages such as coffee, tea, Postum, or the like, rapidly and in small batches, and has for its objects—

First, to provide a device in which the substance to be brewed may be stored in a receptacle and automatically released in measured quantities and thereupon steeped in a brewing vessel with measured quantities of water previously heated to the proper temperature to produce the desired infusion or brew;

Second, to provide a device having a bin into which ground coffee or other substance to be brewed may be introduced and stored, and a vessel into which water may be introduced and heated to a proper brewing temperature and, thereafter, at desired intervals, predetermined quantities of said coffee may be automatically released into a brewing vessel and subjected to the steeping action of measured quantities of said heated water and the resultant infusion or brew will then be conducted to one of a plurality of urns from which it may be drawn as desired;

A third object is to provide means in the device above described for providing the required quantities of water heated to the proper temperature and mechanism in conjunction with said heating apparatus for releasing this water at desired intervals and in proper quantities into the brewing vessel;

A fourth object is to provide means in the device above described, for releasing desired quantities of the material to be brewed into the brewing vessel at proper intervals;

A fifth object is to provide mechanism in the device above described for disposing of the grounds remaining after infusion;

A sixth object is to provide mechanism in a device, as above described, for automatically conducting the apparatus above mentioned through a sequence of operations including, the introduction of material to be brewed; introduction and heating of water for brewing purposes; brewing; disposition of the brew into a container urn, and thereafter the removal of the grounds to a disposal bin or receptacle; and Lastly, a further object of the device is to provide mechanism in conjunction with the above for regulating the proportion of material to be brewed in relation to measured quantities of heated water, and of regulating the quantity of brew produced during any one sequence of operation.

I attain the foregoing objects by means of the device illustrated in the accompanying drawings, in which Figure 1 is a side elevation of the entire device with certain portions broken away to show the interior construction;

Figure 9 is a side elevation shown partially in vertical mid-section, of the coffee measuring device drawn on an enlarged scale;

Figure 10 is a sectional end view thereof, taken substantially on line 10—10, Figure 9; and Figure 11 is a diagram of the electrical connections joining the several electrical devices incorporated in the mechanism.

Similar numerals refer to similar parts in the several views.

Figure 1:
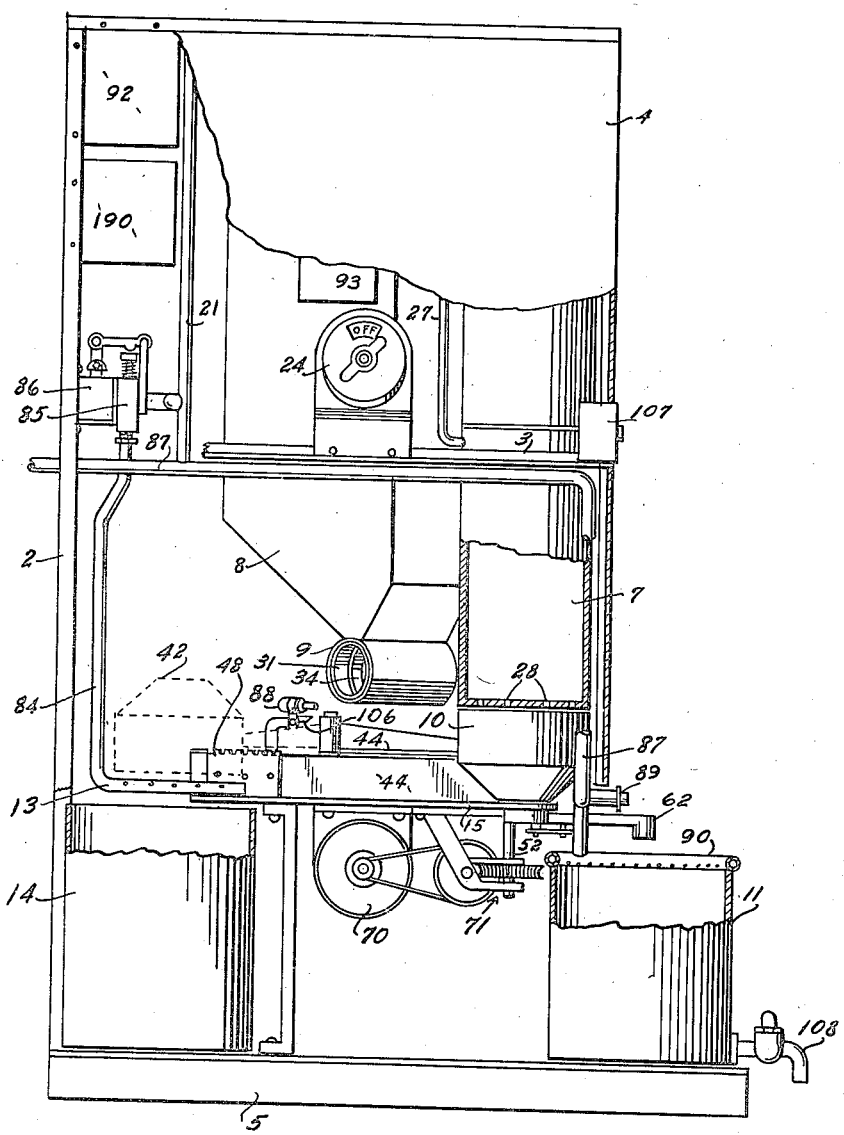

Considering the device as a whole, it is to be understood that the parts, hereinafter described, are mounted within a containing case which includes four main upright members 2, at various places by cross members 3 and covered, where necessary and feasible, with a metallic sheathing 4. In most views it has been necessary to illustrate the sheathing as removed in order to show the interior parts. The entire device rests on a base 5. It is intended that the complete device, as here illustrated, is to be made about 36 inches high and 18 inches wide; and 26 inches in depth; also the parts are proportioned so that approximately 10 cups of coffee may be brewed at each operation. However, all of these dimensions are subject to variation to suit various installations; and the quantity of liquid brewed at each operation is also subject to such variations as are desired. It is understood, however, that one of the important features of the device is that comparatively small batches of coffee, or the like, may be easily, rapidly and automatically prepared just prior to consumption, and no large quantity of brewed coffee need stand in the device until stale.

The main elements composing the device include a water boiler 6, a water measuring container 7, which I term a measurer, positioned below this a coffee bin 8, a coffee measuring device 9, a moving coffe brewer 10, dispensing urns 11 and 12, a brewer washing device 13, a grounds receiver 14, and mechanism for operating the movable coffee brewer supported on a sub-frame 15 within the main body frame above described. These devices are all attached to and supported by the main frame in their various proper positions as hereinafter described.

The water boiler or heater 6 is positioned in the upper portion of the frame and consists of a metal tank 20, in which water is introduced through a water feed pipe 21 and kept at a predetermined level by a float valve 22. As herewith illustrated, water is heated by electrical means and I made use of a "Calrod" heating element 23 set in the bottom of tank 20 and connected by proper conduits to a source of electrical supply which is controlled by a switch 24. Water, after being heated in this tank or container, is released by a trap valve 25 supported by an electrical solenoid trip 26 positioned on top of the boiler. When this trip is operated water rapidly flows into the water measuring container 7, air being permitted to escape from the latter through a vent tube 27. The measuring container is provided with a plurality of holes 28 in its bottom. These holes are sized, positioned and of a sufficient number so that water runs from the measuring tank into the brewer 10, when positioned below the measure container, with sufficient velocity to flood but not overflow the brewer when it is charged with a measured quantity of substance to be brewed.

The coffee bin 8 is of rectangular form having a sloping bottom which terminates in a cylindrical measuring device 9. This is composed of a cylindrical shell 30, having a revolving measuring cylinder 31 fitted therein (see Figures 9 and 10). The measuring cylinder is provided with a slotted opening 32 to receive coffee from the bottom of the bin 8 when turned upward and registering with the slotted bottom of the bin and to discharge coffee thus received when revolved to an inverted position and in register with a slot 33 in the bottom of shell 30. A cup-shaped plug 34 is inserted into the outer end of rotating cylinder 31 and may be axially adjusted to vary the quantity of coffee cylinder 30 will receive from the bin. Cylinder 30 is turned by a shaft 35 driven by mechanism hereinafter described. It is to be understood that during its rotation it first receives a charge of coffee from the bottom of bin 8 and thereafter as it turns it releases the charge received through the slot 33 and into the brewer 10 when it is positioned below this slot. One side of cylinder 31 is flattened as shown at 36 to prevent coffee hanging along the edge of slot 32 when inverted.

Figures 2, 3:
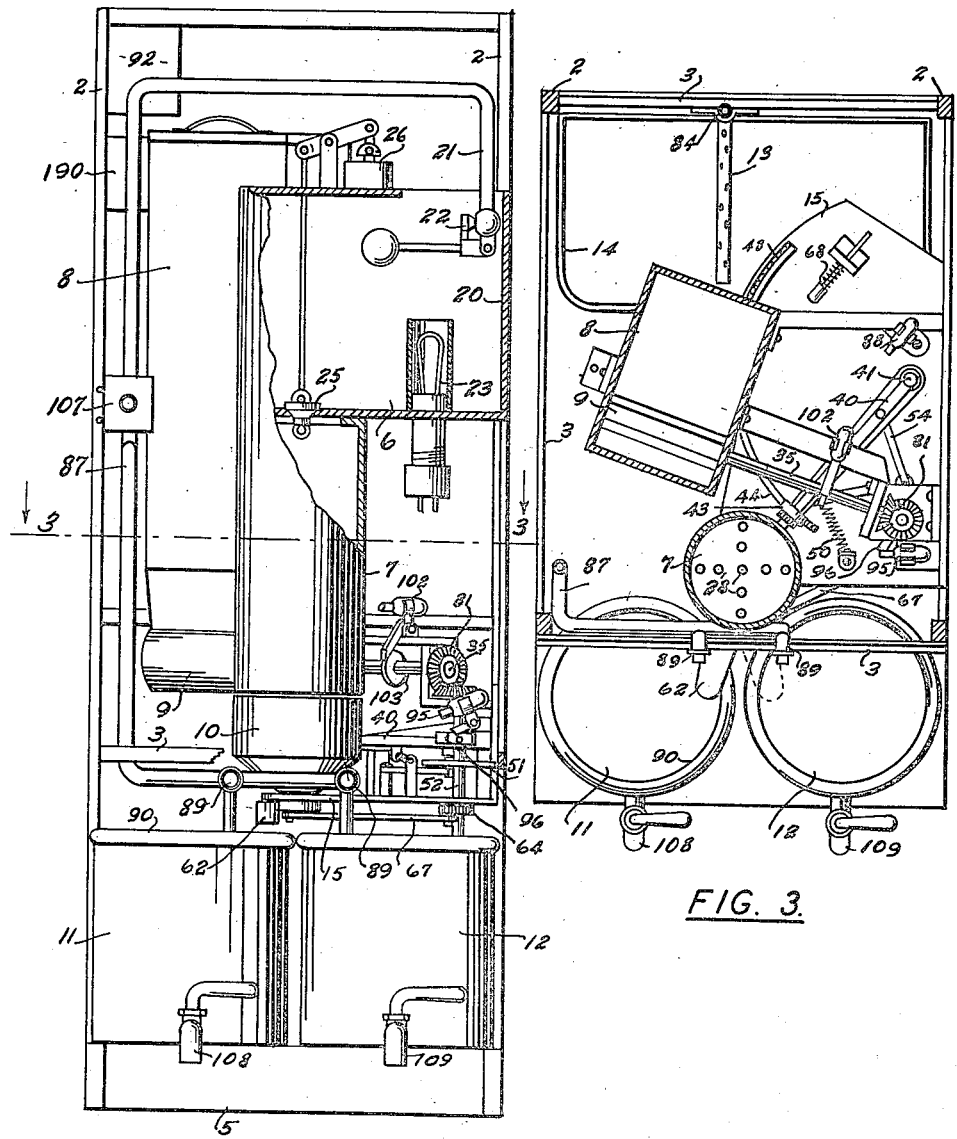
Figure 2 is a front elevation of the device with certain portions broken away to show the interior thereof.
Figure 3 is a horizontal plan taken substantially on lines 3—3, Figure 2.

The brewer 10 is supported on a horizontally extending arm 40, which in turn is pivoted on a shaft 41 to swing horizontally throughout an arc extending from the position shown in Figures 1 and 2 to the position indicated by dotted lines 42. Near its outer end the brewer supporting arm 40 is afforded additional support by a shoe 43 which travels on an arcuate rail 44 made a part of and extending upward from the sub-frame plate 15. The brewer 10 is supported at the end of arm 40 on a trunnion bearing 45 by means of a sleeve 46.

The inner end of sleeve 46 carries a gear 47, and these several parts assembled so that the brewer 10 is free to turn on the trunnion 45. Throughout its arcuate travel from the position illustrated, the brewer is maintained in an upright position as illustrated, but near the left or far end of its travel gear 47 encounters rack 48 which is positioned and proportioned so that the brewer is inverted to the position indicated by the dotted lines 42 when it reaches the left extremity of its travel. This motion is reversed as the brewer arm returns from this left position toward the right.

Figure 4:
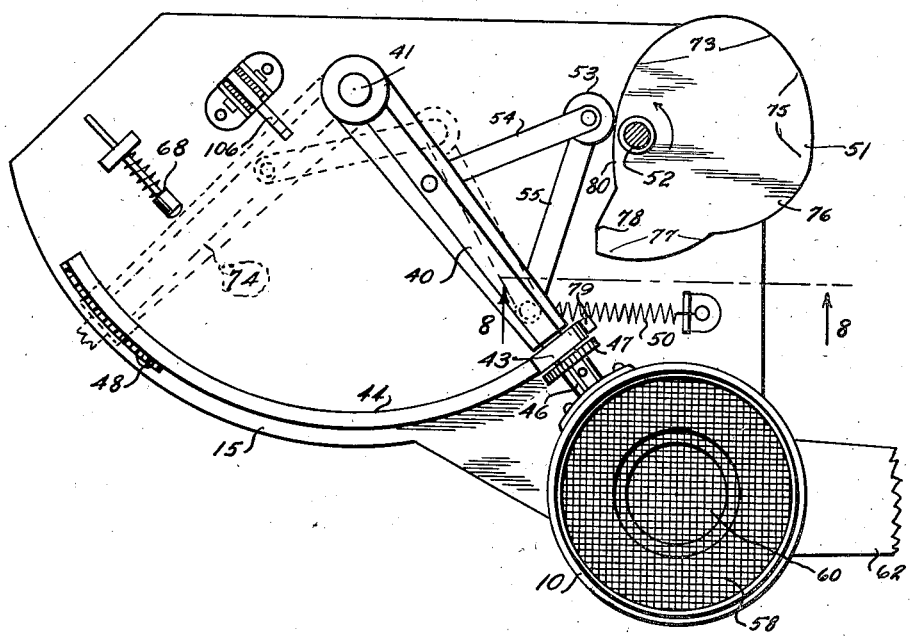
Figure 4 is a plan view of the main portion of the mechanism used to operate the brewing device, drawn on a somewhat enlarged scale.

The brewer supporting arm 40 is normally held to the right by a spring 50. Movement to the left is controlled by a cam 51 mounted on the vertical shaft 52 and contacting a cam follower 53 which communicates motion, as imparted by the contour of this cam, through a push rod 54. A steadying lever arm 55 is pivoted at one end on the cam follower bearing pin, and at the other, on a bearing pin on supporting post 56. The left extremity of motion of these parts is indicated in dotted lines, Figure 4.

In the form herewith illustrated, the brewer 10 is made with an upper cylindrical cup 57, in the bottom of which is a screen 58, supported at the edges by a stiffening ring, and fitted into the cup friction tight. Below this screen there is a funnel portion 59, provided with an opening 60 sized so as to direct brewed beverage into a tubular sleeve 61 of beverage delivery spout 62. This spout is retained in position by the tubular sleeve 61 extending into a suitable hole in frame 15, which forms a bearing so as to permit the spout to swing from the position over urn 11, as shown in Figure 2, to a similar position over urn 12. This swinging motion is provided by a gear 63 mounted on shaft 52 beneath the frame 15 driving a gear 64 bearing on pintle 65 which supports a crank pin 66, to which is attached one end of a driving rod 67, the other end of which is attached to the spout by a pin 68. Gear 64 is made twice the diameter of gear 63 so that a complete swinging motion is imparted to delivery spout 62 every other revolution of shaft 52. A resilient limiting stop 68 is attached to plate 15 to contact brewer supporting arm 40 at the left hand extremity of its motion.

Shaft 52 is driven by a constant speed electric motor 70 suspended beneath frame 15 and communicating its motion through a suitable speed reduction mechanism 71. Starting and stopping of motor 70 is controlled by switches hereinafter described. Shaft 52 turns in a counterclockwise direction as viewed in Figure 4. In this figure, the position of the brewer supporting arm 40, as above explained, is at the right hand limit of its travel. In this position it holds the brewer 10 directly under the water measurer 7 and directly over the spout sleeve 61. When motor 70 is started, and shaft 52 commences rotation the swell 73 on cam 51 forces follower 53 to the left. As rotation continues the follower, its supporting lever and arm 40 assume the position indicated by the dotted lines 74 which is the left hand limit of their travel. During the latter part of this motion the brewer is inverted as above described. As rotation of cam 51 continues the brewer is held in inverted position at this left extremity of its motion by the dwell 75 on the cam. During this period the inverted brewer is washed by spray pipe 13. As rotation continues, a recede 76 permits arm 40 to return to an intermediate position in its arcuate travel and to a point where the brewer is positioned directly beneath the coffee measurer 9. Arm 40 is caused to pause in this position by the dwell 77 on the cam. When in this position the brewer receives a measure of coffee from measuring cylinder 31. Thereafter the arm is returned to its extreme left position by a rapid recede 78. The latter portion of this motion is rather abrupt and motion of the arm is stopped by a lug 79 on rail 44. This jarring and bumping action tends to level any coffee contained in the brewer. At this point a cycle of operations has been completed and motor 70 is stopped, as hereinbefore explained.

Horizontal shaft 35, which drives the coffee measure cylinder 31, is driven by vertical shaft 52 by means of bevel gears 81 and turns at the same speed. Cylinder 31 is positioned on shaft 35 so that when arm 40 holds brewer 10 at the intermediate position beneath coffee measurer 9, the slot 32 in cylinder 31 will register with slot 33 in outer shell 30 and the contents of measuring cylinder 31 will be deposited in the brewer.

As previously explained, brewer 10 is inverted by gear 47 and rack 48 at the left extremity of its motion. In this position it is directly over the spray pipe 13. Water is supplied to this spray pipe through pipe 84 and valve 85 operated by an electrical solenoid 86. This valve is connected through intermediate pipe to the main water supply pipe 87. Solenoid 86 is actuated by a mercury tilt switch 88 positioned on frame 15 and provided with a suitable contact finger 106 positioned to contact arm 40 when at the left extremity of its motion. When the brewer is in the inverted position as indicated by dotted lines 42, it is thus subjected to a spray of water sufficient to wash out any grounds that it may contain. Supply pipe 87 also joins the pipe 21 conducting water to the water boiler 6, and continues downward through spring push valves 89 to spray pipes 90 encircling the top of each urn. These valves are opened manually when desired to flush and clean the urns 11 and 12.

The device, as here illustrated, is operated principally by electricity. The electrical wiring diagram is shown in Figure 11. The other figures do not show electrical connections since it is considered that these would serve to confuse more than clarify. In practice, wiring of the electrical parts, hereinafter mentioned, is enclosed in BX cable or conduit and attached by clips to the members of the main frame. In Figure 1, 190 illustrates a junction box to receive the line wires 89 which preferably supply 110 volts alternating current. Positioned above this is a box 92 containing a solenoid switch and positioned on the sheathing 4 near switch 24 is an electrical thermostat switch and box 93.

Referring to the diagram, one set of leads 94 extends from the junction box 190 to form a circuit including the motor 70, a mercury tilt cut off switch 95 and a solenoid switch 92 in the main circuit. A starter push button switch 107 is shunted into the circuit through the solenoid winding and is used to manually close the motor circuit and start the motor. It will be noted that when this switch is closed the contacting lever 97 closes on the contact 98 and this closes the circuit through the motor and tilt switch 95. The solenoid holds the contact closed and the motor continues to run until this circuit is broken by the tilt switch 95. This switch is positioned on a support as shown in Figure 1 and actuated by a cam 96 attached to shaft 52 which is positioned to trip the switch 95 when brewer arm 40 reached the right hand extremity of its travel; that is, when it is directly under the water measurer. When cam 96 trips the tilt switch and breaks the circuit through the motor, thereupon the solenoid releases the contact lever 97 and thereafter the circuit remains open until again closed by push button switch 107. It is only necessary to momentarily break the circuit to open the solenoid switch, thereafter the momentum of the apparatus will carry the cam beyond the shut off position.

Heavy leads 100 carry the current from the junction box 90 to the electrical heating elements 23 in the water boiler 6. This circuit is controlled by the two-way switch 24 so that either a part or all of the heating elements (Calrods) may be used. Optionally this switch may be provided with sufficient poles and bars so as to connect dual heating elements either in series or in parallel to obtain regulated rapidity of heating. This heating current is further regulated by a thermostat switch 93 contained in the box above mentioned. It is of the usual make and break type actuated by a gas bulb (not shown) which is attached to or inserted into the water boiler 6 so that current in this circuit will be cut off when the temperature of the water therein exceeds a predetermined temperature. These switches are well known to those familiar with the art, and it is thought unnecessary to detail their construction. The exact position of the thermic bulb is not important except that it should be positioned to attain the temperature of water in the boiler. In practice, this thermostat is set so that water in the boiler is maintained at a temperature just below the boiling point, at the altitude at which the machine is operated.

Solenoid 26 which opens valve 25 in the water boiler is connected in a circuit 101 which leads from the junction box through the mercury tilt switch 102 operated by a cam 103 positioned on the horizontal diagonally extending shaft 35. A lobe on this cam is positioned so that, just before the motor mechanism swings arm 40 to bring brewer 10 directly under the measure 7, the circuit is closed for a period long enough to permit water from boiler 6 to fill the measure 7 with the desired quantity of water. Valve 25 is proportioned so that this operation takes but a short time and the mechanism continues its motion until stopped by switch 95, as above explained, at which point the lobe on cam 103 has moved sufficiently so that switch 102 is again open and the valve 25 closed.

Figure 5:
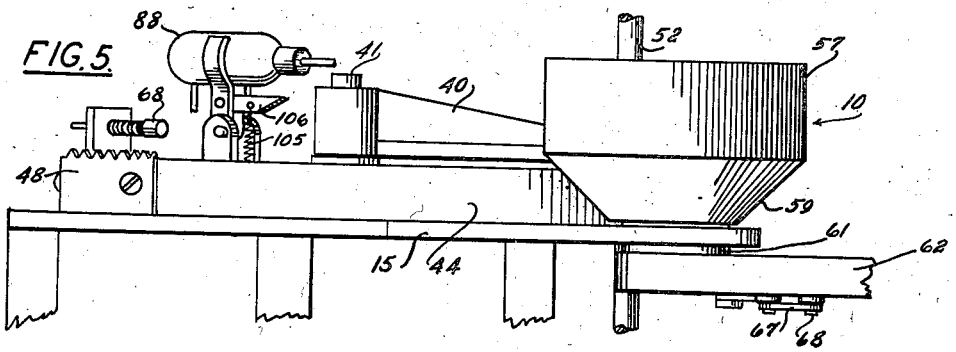
Figure 5 is a front elevational view thereof.
Figures 6, 7, 8:
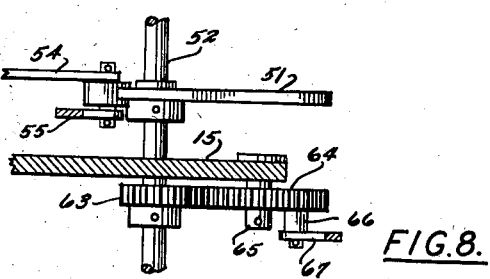
Figure 6 is a fragmentary portion of the brewer supporting arm showing mechanism for inverting the brewer.
Figure 7 is a fragmentary elevational view showing the brewer inverting mechanism.
Figure 8 is a sectional elevation taken substantially on line 8—8, Figure 4, showing portions of the brewer operating cam and delivery spout shifting mechanism.

Circuit 104 includes the solenoid valve trip 86 which operates the wash water valve 85 and the mercury tilt switch 88, which is mounted and positioned with an operative lever as shown particularly in Figure 5, to contact the arm 40 when it swings to the left hand limit of its travel. This switch is positioned on its supports so that, when it is tilted against the tension of its spring 105 by contact of finger 106 with the said arm, the circuit is closed through the solenoid 86, thus opening the valve 85. As the motion of the mechanism continues from this point, arm 40 is drawn from the extreme left position and this switch closes under the action of spring 105.

These switches are all of a type well known to those familiar with the art. They can be mounted at any convenient angle to either open or close electrical circuits, depending on the position of mounting and the method of tilting this mounting. Since they are manufactured with two terminals enclosed within an insulating case which contains a small amount of mercury, they are considered the safest, the most positive acting and the most readily adaptable electrical switches for the purposes here concerned. The view of switch 88 in Figure 5 is a typical mounting for all switches although the functions and time of cut off may be different, as above explained.

General operation of the device typically commences with the filling of coffee bin 8 with coffee of the type and grind desired. Water supply pipe 87 is connected with the source of water under pressure, preferably heated water as is usually available in modern restaurant installations. Water boiler 6 then fills with heated or warm water to the level controlled by valve 22. Current through the heater 23 is turned on by switch 24 and after the water has been heated to the proper temperature for brewing purposes, as controlled by thermostat 93, the machine is ready for the first brewing operation. This is started by the closing of switch 107. Upon closing this switch solenoid switch 92 is closed, as above described, motor 70 commences its cycle of operations and continues until stopped by the opening of switch 95. Arm 40 carrying brewer 10 moves from the position where it may be at rest, which is usually in that position shown in Figures 1 and 2, back to the left hand extent of its travel where it is inverted and flushed with wash water, as described above. Continued operation of the motor moves arm 40 toward the right and to the intermediate position, above explained, where the brewer receives a measured charge of coffee from the measure 9. After this pause, arm 40 continues movement to the right hand extremity of its travel. During the latter portion of this motion heated water has been introduced into measure 7 and by the time the brewer is positioned under this measure, this water starts to trickle through holes 28 in the bottom of the measure and into the upper or cup portion of the brewer. The abrupt recede 78 of cam 51 causes the brewer arm to jar at the right hand extremity of its motion, which helps level off the coffee deposited on screen 58 in the brewer cup. As water enters the brewer cup the coffee or other like substance to be brewed is steeped and the brew or infusion percolates and descends through the screen 58 to the funnel shaped portion 59 of the brewer body from which it descends into the collar or sleeve bearing 61 and thence into the spout 62. This spout, at this position of arm 40, will be over either urn 11 or urn 12, since, as above explained, this spout is moved from one urn to the other throughout every other rotation of shaft 52. The brewing operation continues until all the water has drained from the measure 7 and the brew therefrom deposited in urn 11. Thereafter, this brew may be drawn from the urn 11 through the valve 108, as desired. When the quantity of brew in urn 11 becomes depleted switch 107 is again closed. A second sequence of operations follows during which the grounds are washed from the brewer, a new charge of coffee deposited therein, and a new measure of hot water drawn and percolated. During the first part of this process spout 62 will be moved so that the new batch of brew will be deposited in urn 12 from which it can be drawn through valve 109.

It will be apparent to those familiar with the art that the mechanism herein shown is subject to a large degree of variation, both as to size, speed of operation, and the exact placement of the parts, therefore I make no limitation as to, for example, the size of holes 28, the size and setting of the coffee measure sleeve, the speed of motor 70 and the consequent speed of shaft 52, nor the mesh size of screen 58, nor the depth and size of brewer 10. All these devices are subject to changes in size and dimension according to the substance to be brewed and the strength of brew desired. However, it is pointed out that the mechanism here disclosed is sufficiently flexible and adaptable to permit its application to any type or degree of brew desired. All and any such changes would obviously remain within the spiirt of the invention, and it is further to be noted that, while I have indicated the use of electricity as a means for heating the water in boiler 6, other means of heating can be readily used, such as gas, liquid fuels thermostatically controlled. Also, while I have illustrated and described certain definite positions for the water measurer, the spray washer, and the coffee measurer, the position of these elements is subject to wide variations so long as they remain in operative position within the arcuate swing of the brewer. Further, while I have indicated the use of mercury tilt switches, and these are considered to be the most efficient for the purpose concerned, it is conceivable that other types of switches may be used and these may be mounted in various positions different from those indicated in the above description, as for example, all switches may be mounted to take action from shaft 35 or shaft 52. The sequence of opertion of these switches, however, must remain the same in order to secure the cycle of operations desired. With the above in mind, I therefore wish to be limited only by the following claims.

I claim:

1. A beverage brewer comprising, in combination, a bin to contain material to be brewed, having automatic measuring mechanism at the bottom thereof, a water boiler having means for heating water to a predetermined temperature, a water measurer positioned beneath said water boiler, a plurality of beverage receiving urns, a grounds receiver, a beverage brewer adapted to move from the brewing position beneath said water measurer to a position for the removal of grounds into said grounds receiver, thence to a position to receive a measured quantity of material to be brewed from said bin and thence back to said brewing position to complete a cycle of operation, together with mechanism for introducing a measured quantity of water into said water measurer, for moving said brewer throughout said cycle of operations, and for directing the brewed beverage alternately to any of said beverage receiving urns.

2. In a device as herein disclosed as a subcombination, brewing mechanism including a brewing receptacle, a pivotally mounted swinging brewer arm adapted to support said receptacle, a trunnion bearing on the free end of said brewer arm engaging a sleeve on said brewer receptacle so that it may be inverted during a predetermined portion of its swinging travel, mechanism for imparting an oscillating motion to said brewer arm through a sequence of brewing operations, including a motor, a shaft driven thereby, a cam mounted on said shaft, a cam follower actuated by said cam and communicating resultant motion to said brewer arm, the contour of said cam being shaped so that during a revolution of said shaft said brewer is swung by said cam follower from a brewing position at the inner end of its swing to a washing position at the outer end of its swing, thence to a pause at an intermediate position where a fresh charge of material to be brewed is inserted, and back to its said original position, together with mechanism for inverting said brewer when at said washing position, including an arcuate rack positioned to engage a pinion carried on said sleeve on said brewing receptacle.

3. A beverage brewer as herein disclosed, including, in combination, a water boiler having means for heating water therein and raising same to a predetermined temperature, and having a constant level fresh water feed, a water measurer adapted to receive water from said water boiler, a mechanically actuated valve for releasing water from said water boiler into said water measurer during predetermined intervals of the operation of said device, brewing mechanism including a swinging brewer supporting arm, a brewer having a brewing compartment with a screened bottom and a funneled portion therebeneath, pivotally supported on said arm to provide for inversion during the outer portion of the travel of said brewing arm, said arm being proportioned and adapted to oscillate said brewer in an arcuate path from a brewing position beneath said water measurer at the inner portion of its swing to a grounds removal position at the outer portion of its swing and thence back to said brewing position, grounds removal mechanism including an arcuate rack cooperative with a pinion on said pivotal brewer support adapted to invert said brewer during the outer portion of its arcuate travel, means for spraying water into the brewing compartment of said brewer when so inverted and a grounds receiver positioned below the brewer when in inverted position, brew receiving mechanism including a pair of urns, a sleeve positioned beneath said brewer when in brewing position adapted to receive brew from the funneled portion of said brewer, an oscillating spout connected thereto and adapted to swing whereby to deliver brew to said urns alternately, a bin to contain material to be brewed having measuring mechanism adapted to release predetermined portions of said material therefrom into said brewer at a predetermined intermediate position of its arcuate travel, operative mechanism including a motor, a cam mounted on a shaft driven thereby, adapted to oscillate said brewer's supporting arm, a shaft geared to said cam supporting shaft adapted to drive said measuring mechanism and gearing and crank devices adapted to oscillate said brew delivery spout, all coordinated to carry said brewing, water measuring and said material measuring mechanism and said brewer through a cycle of operations including release of a predetermined quantity of material to be brewed into said brewer while in an intermediate position of its travel from brewing position to grounds removal position, release of a predetermined quantity of water into said brewer when in brewing position, movement of said brewer to grounds removal position and inverting same and spraying the interior with wash water, partial return of said brewer to an intermediate charging position to receive material to be brewed, thence returning to brewing position to receive a fresh charge of heated water, and coincidentally moving said brew delivery spout alternately from one of said urns to the other.

4. A beverage brewer including, in combination, a brewer having a cup shape body with a screen bottom therein and a directive opening therebelow, a swinging brewer supporting arm, a bin to contain material to be brewed having mechanism operative in conjunction with said bin for measuring and releasing predetermined quantities of said material in said brewer, and a water boiler adapted to maintain a pre-determined quantity of water at a heat approximating boiling, and means including a water measuring vessel adapted to receive a pre-determined amount of water from said boiler, and to release said water from said boiler into said brewer, said measure having a plurality of spaced holes in the bottom thereof to evenly distribute said water throughout the horizontal area of said brewer, means including a spout and urn for receiving and retaining brew until used, and grounds remover means including mechanism for inverting said brewer on said swinging supporting arm, and for washing the interior thereof when so inverted, together with motor-driven operating mechanism for carrying said brew, water measure, brew material measure, and grounds removing mechanism through a cycle of brewing operations including delivery of the measured quantity of material to be brewed to said brewer, drenching said material with a pre-determined quantity of heated water from said water measurer, receiving said brew into an urn receptacle, moving said brewer on said arm from said brewing position to a grounds-removing position, inverting it and spraying the inside thereof with wash water, thence righting the brewer and returning it to first position mentioned.

GEORGE A. DENTON.